(12) United States Patent
Futonagane et al.

(10) Patent No.: US 6,729,297 B2
(45) Date of Patent: May 4, 2004

(54) FUEL INJECTION CONTROL DEVICE

(75) Inventors: Yoshinori Futonagane, Susono (JP); Yoshimasa Watanabe, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/465,843

(22) Filed: Jun. 20, 2003

(65) Prior Publication Data

US 2003/0233998 A1 Dec. 25, 2003

(30) Foreign Application Priority Data

Jun. 24, 2002 (JP) ........................................ 2002-183182

(51) Int. Cl.$^7$ ................................................. F02B 3/00
(52) U.S. Cl. ........................................ 123/299; 123/294
(58) Field of Search ................................ 123/299, 305, 123/294, 300, 434, 472

(56) References Cited

U.S. PATENT DOCUMENTS 5,402,760 A * 4/1995 Takeuchi et al. ............ 123/300

FOREIGN PATENT DOCUMENTS

| JP | 2000-18074 | 1/2000 |
|---|---|---|
| JP | 2001-152948 | 6/2001 |
| JP | 2001-152949 | 6/2001 |

* cited by examiner

Primary Examiner—Bibhu Mohanty
(74) Attorney, Agent, or Firm—Oliff & Berridge, PLC

(57) ABSTRACT

In a fuel system of an internal combustion engine, a fuel pressure sensor is disposed on a high pressure fuel pipe connecting common rail and a fuel injection valve. An electronic control unit (ECU) of the engine calculates the magnitude P of the fuel pressure fluctuation from the fuel pressure detected by the pressure sensor when a pilot fuel injection is executed. The ECU calculates the actual amount Qpl of the pilot fuel injection from the magnitude P and pressure Pc in the high pressure fuel pipe based on the relationship between Qpl and P, Pc determined beforehand by experiment. The ECU further corrects the fuel injection period of the fuel injection valve in such a manner that the difference dQpli between the actual amount Qpl and a target amount Qplt of pilot fuel injection becomes within an allowable range. Thus, the fuel injection amount of the fuel injection valve always agrees with the target fuel injection amount even if a fuel injection characteristics have changed after long period of operating the engine.

5 Claims, 4 Drawing Sheets

Fig.4

FUEL INJECTION CONTROL DEVICE

BACKGROUND OF THE INVENTION

1. Field of the Invention

The present invention relates to a fuel injection control device, for an internal combustion engine, which executes a pilot fuel injection prior to a main fuel injection.

2. Description of the Related Art

Regarding a diesel engine, a pilot fuel injection, which injects a small amount of fuel into a combustion chamber prior to a main fuel injection, is known in the art.

In an internal combustion engine such as a diesel engine, diesel knock sometimes occurs. Diesel knock is a phenomenon which causes the combustion noise to increase. When the rate of pressure rise in the cylinder of the engine becomes excessively large due to, for example, a delay in ignition of the fuel, resonance in the combustion gas occurs. This causes a sudden increase in combustion noise, i.e., diesel knock.

It is generally known that the increase in combustion noise occurs under conditions where the ignition of fuel is delayed, such as in a cold start of the engine. Further, in a transient operating condition of the engine, the increase in combustion noise may occur due to delay in the change in the temperature of intake air and combustion chamber of the engine. Further, in an engine employing a high pressure fuel injection, as combustion speed increases due to high fuel injection pressure, an increase in combustion noise may occur.

It is known in the art that a pilot fuel injection, which injects a small amount of fuel in the cylinder prior to the main fuel injection, is effective for preventing the increase in combustion noise. As fuel injected in into the combustion chamber by the pilot fuel injection burns before the main fuel injection is executed, the pressure and temperature in the combustion chamber increase to suitable conditions for combustion of fuel and, thereby, the delay in the ignition of the fuel injected by the main fuel injection is shortened and an increase in combustion noise is suppressed.

An example of the internal combustion engine employing a pilot fuel injection is disclosed in Japanese Unexamined Patent Publication (Kokai) No. 2000-18074. In the '074 publication, a plurality of pilot fuel injections, each injecting a small amount of fuel, are performed in order to prevent liquid fuel drops from reaching the cylinder wall. When liquid fuel injected by a fuel injection reaches the cylinder wall without evaporating, the liquid fuel dilutes lubrication oil on the cylinder wall and causes insufficient lubrication. In the '074 publication, the amount of the fuel injected by each pilot fuel injection is reduced so that all the fuel inject by each pilot fuel injection evaporates before reaching the cylinder wall.

In a diesel engine employing a high pressure fuel injection system, which is prone to a diesel knock, a pilot fuel injection is employed in order to suppress the diesel knock.

In the high pressure fuel injection system, usually, a pressure balance type fuel injection valve is used in which the valve element is pressed against the valve seat by the pressure of the fuel in the fuel injection valve housing. The valve opening pressure at which the fuel injection valve opens is determined by an equilibrium between fuel pressure exerted on the valve element on the side where it contacts the valve seat and the fuel pressure exerted on the valve element on the side opposite thereto in the pressure-balance type fuel injection valve.

During the operation of the pressure-balance type fuel injection valve, the valve element and the valve seat collide each other in the fuel injection operation, whereby the valve seat gradually wears.

When the valve seat wears, the aperture of the valve seat, where the tip of the valve element fits, is enlarged. This causes a decrease in the area of the portion of the valve element located outside of the aperture. As the fuel pressure exerted on the portion of the valve element outside of the aperture acts in the direction for opening the fuel injection valve, when the area of this portion of the valve element decreases, a higher fuel pressure is required in order to lift the valve element from the valve seat. In other words, the valve opening pressure increases as the wear of the valve seat increases.

When the valve opening pressure becomes higher, the time required for the fuel pressure in the fuel injection valve to increase to the valve opening pressure after the fuel injection command signal is transmitted becomes longer even if the length of the fuel injection command signal is the same. As the length of the fuel injection command signal corresponds to a target amount of fuel injection, when the time required for the fuel pressure to increase the valve opening pressure increases, the actual time period where the valve element is away from the valve seat (the actual fuel injection period) becomes shorter and the actual fuel injection amount becomes smaller even if the length of the fuel injection command signal becomes smaller.

Thus, the fuel injection characteristics, such as the relationship between the length of the fuel injection command signal and the actual fuel injection amount, or a valve opening pressure, change as the operation period of the fuel injection valve becomes longer. In this case, even if the length of the fuel injection command signal is constant, the actual fuel injection amount gradually decreases.

The magnitude of decrease in the fuel injection amount due to the wear of the valve seat is relatively small. However, as the amount of fuel injected by a pilot fuel injection is small, this decrease in the fuel injection amount adversely affects the pilot fuel injection in some cases.

Therefore, in the diesel engine employing pilot fuel injection, the target amount of the pilot fuel injection is usually set at a value larger than the amount actually required so that a sufficient amount of the pilot fuel injection can be obtained even after wear of the valve seat, due to a long operating period, occurs.

However, when the target amount of the pilot fuel injection is set at a value larger than the amount actually required for the pilot fuel injection, the actual amount of the pilot fuel injection becomes excessively large in some cases. If an excess amount of fuel is injected in the pilot fuel injection, the dilution of lubricating oil by liquid fuel drops reaching the cylinder wall, or exhaust smoke due to excess amount of pilot fuel injection, occur.

On the other hand, if the target amount of the pilot fuel injection is set at a value which does not include the margin, the amount of the pilot fuel injection becomes insufficient after a long operating period and, thereby, the diesel knock or deterioration of exhaust emission occurs in some cases.

SUMMARY OF THE INVENTION

In view of the problems in the related art as set forth above, the object of the present invention is to provide a fuel injection control device capable of controlling the fuel injection amount to exactly required value by detecting changes in fuel injection characteristics of the fuel injection valve and correcting the fuel injection command signal in accordance with the changes in the fuel injection characteristics.

The object as set forth above is achieved by a fuel injection control device, according to the present invention, comprising a reservoir storing high pressure fuel, a fuel injection valve connected to the reservoir and injects fuel stored in the reservoir into a combustion chamber of an internal combustion engine, the device executing a pilot fuel injection by injecting fuel into the combustion chamber prior to a main fuel injection, wherein the device further comprises fluctuation detecting means for detecting a magnitude of the fluctuation of pressure caused by the pilot fuel injection in fuel supplied to the fuel injection valve, correction means for calculating a magnitude of change in pilot fuel injection characteristics of the fuel injection valve from a standard fuel injection characteristics based on the magnitude of the pressure fluctuation detected by the fluctuation detecting means and for correcting the amount of the pilot fuel injection based on the change in the pilot fuel injection characteristics in such a manner that the actual amount of fuel injected by the pilot fuel injection agrees with a target pilot fuel injection amount.

According to the present invention, in a fuel injection system equipped with a reservoir (a common rail), the change in the fuel injection characteristics of the fuel injection valve from the standard fuel injection characteristics is calculated based on the magnitude of the fluctuation of fuel pressure accompanying the pilot fuel injection.

When the pilot fuel injection is executed, the fuel pressure in the fuel system fluctuates and the magnitude of the fluctuation changes in accordance with the pilot fuel injection amount. For example, when the pilot fuel injection amount decreases due to wear of the valve seat, the magnitude of the fluctuation of fuel pressure accompanying the pilot fuel injection decreases accordingly.

Therefore, it is possible to determine the magnitude of change in fuel injection characteristics, such as the fuel injection amount, from the fuel pressure fluctuation accompanying the pilot fuel injection. Further, it is also possible to correct a fuel command signal in accordance with the change in the fuel injection characteristics so that the actual pilot fuel injection amount agrees with a target amount. Therefore, the actual pilot fuel injection amount can be adjusted to the target value regardless of the state of the fuel injection valve, for example, from the state when the fuel injection valve is new to the state the fuel injection valve has been used for long time. Thus, the pilot fuel injection amount is always controlled to suitable value and, thereby, dilution of the lubricating oil or deterioration of the exhaust gas property does not occur.

Further, the change in the fuel injection characteristics affects the main fuel injection amount in the same manner as that on the pilot fuel injection amount. Therefore, the main fuel injection amount can also be corrected based on the change in the fuel injection characteristics in pilot fuel injection. Thus, it is also possible to correct the main fuel injection amount based on the change in the fuel injection characteristics in pilot fuel injection.

Further, as the fuel injection characteristics change in accordance with, for example, wear of the valve seat of the fuel injection valve, it is possible to determine the degree of deterioration of the fuel injection valve (such as wear of the valve seat) based on the magnitude of change in the fuel injection characteristics. For example, if the change in the fuel injection characteristics is large, it can be determined that wear of the valve has increased to an impermissible degree. Further, when the pilot fuel injection amount or the main fuel injection amount is corrected in accordance with the change in the fuel injection characteristics in such a manner that the actual fuel injection amount agrees with the target value, the correction amount of the fuel injection amount corresponds to the change in the fuel injection characteristics. Therefore, degree of deterioration of the fuel injection valve can be determined based on the correction amount of the pilot fuel injection amount or the main fuel injection amount.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, an embodiment of the fuel injection control device according to the present invention will be explained with reference to FIGS. 1 through 4.

Figure 1:
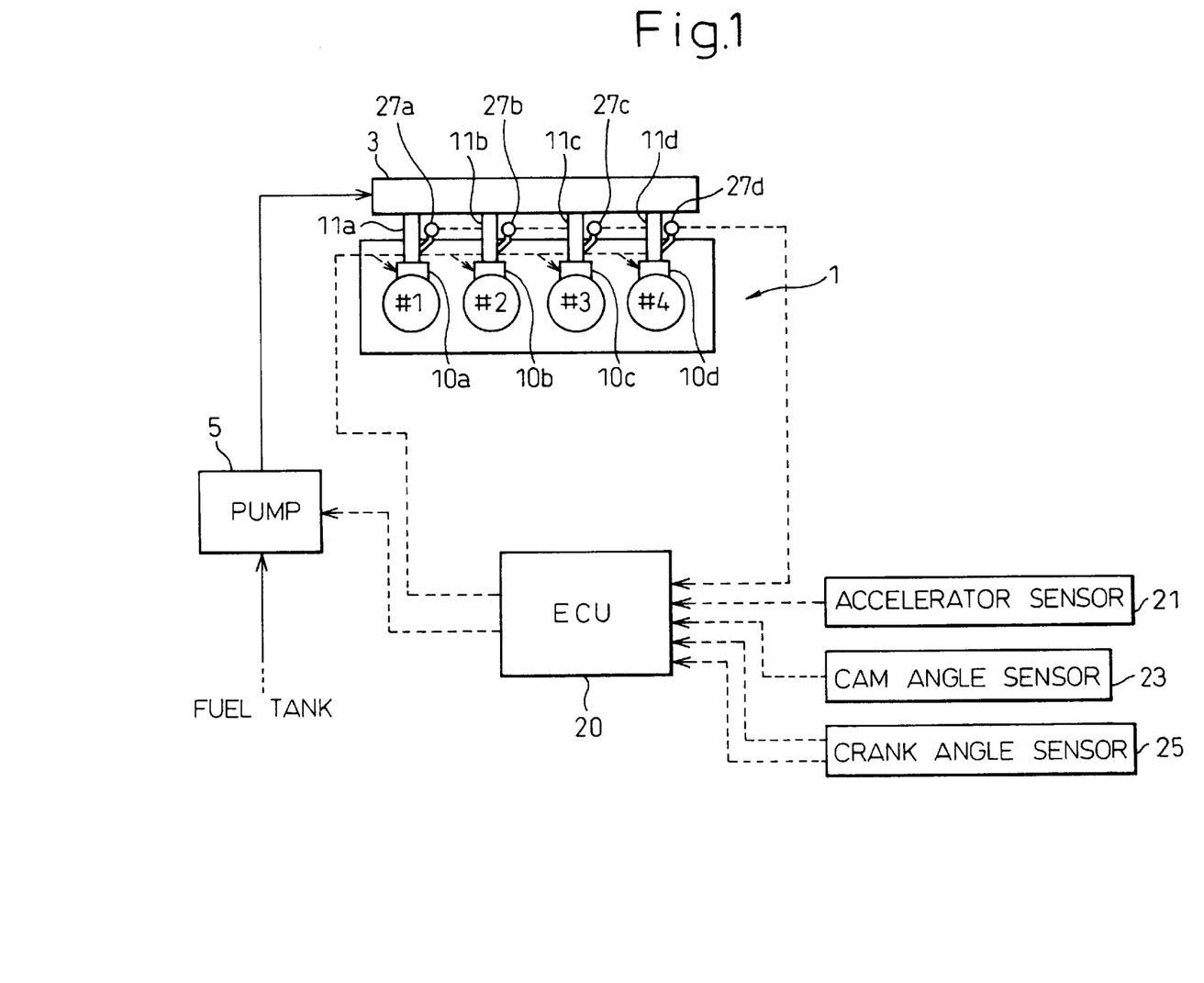
FIG. 1 schematically illustrates the general configuration of an embodiment of the fuel injection control device according to the present invention when it is applied to an automobile diesel engine.

FIG. 1 shows a general configuration of an embodiment of the present invention when it is applied to an automobile diesel engine.

In FIG. 1, reference numeral 1 designates an internal combustion engine (in this embodiment, a four-cylinder four-cycle diesel engine, having No. 1 to No. 4 cylinders, is used). Numerals 10a to 10d designate fuel injection valves, which inject fuel directly into the cylinders No. 1 to No. 4, respectively. The fuel injection valves 10a to 10d are all connected to a common reservoir (a common rail) 3. High pressure fuel is supplied from a high pressure fuel injection pump 5 to the common rail 3 and injected to the respective cylinders through the fuel injection valves 10a to 10d.

In this embodiment, the high pressure fuel injection pump 5 is, for example, a plunger type high pressure pump equipped with a variable capacity control mechanism and it pressurizes low pressure fuel supplied from a fuel tank (not shown) to a predetermined pressure before supplying the fuel to the common rail. The amount of fuel supplied to the common rail 3 from the pump 5 is feedback controlled by an electronic control unit 20 in such a manner that the fuel supply pressure to the respective fuel injection valves detected by the fuel pressure sensor (explained later) becomes a target pressure. Thus, the fuel pressure in the common rail 3 (i.e., fuel injection pressure of the respective fuel injection valves) can be set at a high pressure even when the engine speed is low.

In FIG. 1, numeral 20 is an electronic control unit (ECU) for controlling the engine 1. The ECU 20 may be constructed as a microcomputer of a known type including a read-only memory (ROM), a random-access memory (RAM), a microprocessor (CPU) and input/output ports all connected to each other by a bi-directional bus. The ECU 20 performs basic controls of the engine 1 such as a fuel injection pressure control which adjusts the fuel pressure in the common rail 3 in accordance with the engine load and speed by controlling the capacity of the high pressure fuel pump 5 and a fuel injection control which adjusts the amount of fuel injected into the respective cylinders of the engine 1 by controlling the opening periods of the fuel injection valves 10a to 10d.

Figure 3:
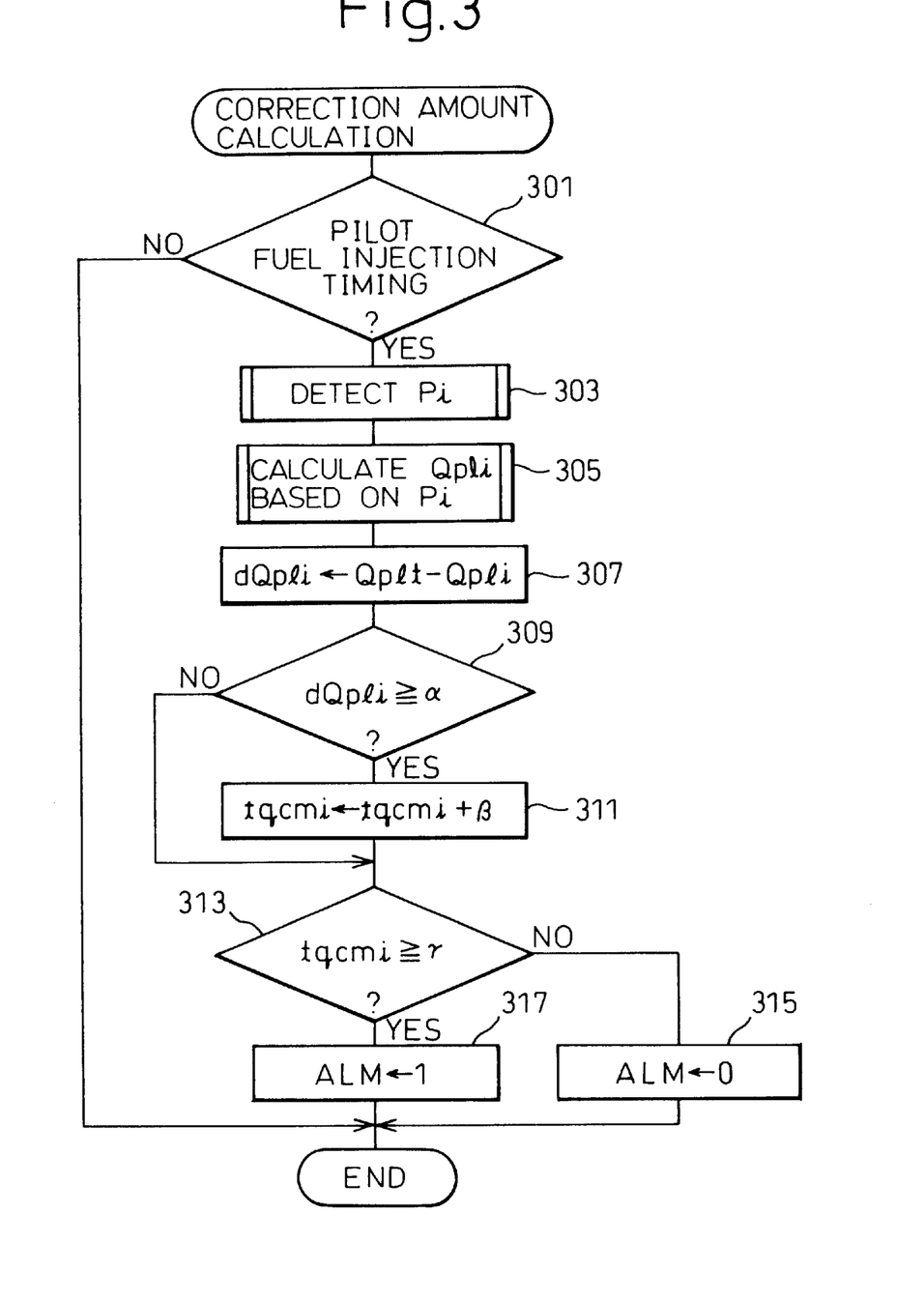
FIG. 3 is a flowchart explaining a calculation of a fuel injection correction amount.
Figure 4:
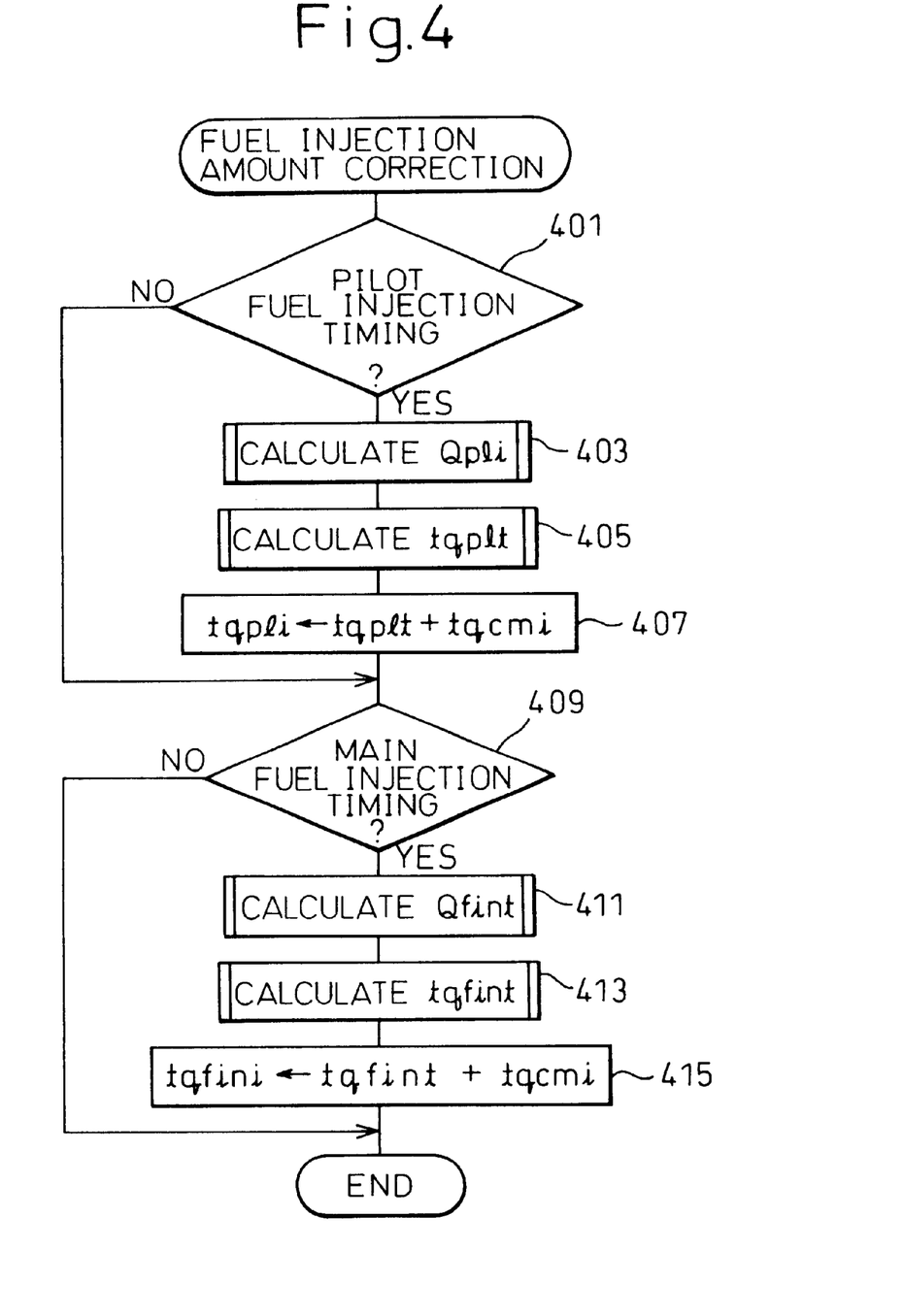
FIG. 4 is a flowchart explaining a correction of fuel injection period.

Further, in this embodiment, the ECU 20 compensates for the changes in the fuel injection characteristics of the respective fuel injection valve 10a to 10d due to long operation by performing a fuel injection amount correcting operation (FIGS. 3 and 4).

In order to perform these controls, a pressure sensor (27a to 27d) is disposed on each of the high pressure fuel pipes 11a to 11d connecting the respective fuel injection valves 10a to 10d to the common rail 3. A voltage signal from the pressure sensor (27a to 27d) corresponding to the pressure of each high pressure fuel pipe is supplied to the input port of the ECU 20 via an AD converter (not shown).

Further, an accelerator signal, which represents the amount of depression of an accelerator pedal by the operator of the automobile, is also supplied to the input port of the ECU 20 via the AD converter from an accelerator sensor 21 disposed near the accelerator pedal (not shown).

In FIG. 1 numerals 23 and 25 are a cam angle sensor for detecting the rotational angle of the camshaft and a crank angle sensor 25 for detecting the rotational angle of the crank shaft, respectively. The cam angle sensor 23 is disposed near the camshaft of the engine 1 and generates a reference pulse signal every 720 degree rotation of the crankshaft of the engine. The crank angle sensor 25 is disposed near the crankshaft and generates a rotating pulse signal at a predetermined angle of rotation (for example, 15 degrees) of the crankshaft. These crank angle signals, i.e., the reference pulse signal and the rotating pulse signal are also supplied to the input port of the ECU 20.

The ECU 20 calculates the rotation speed and the rotational phase of the crankshaft (the crank angle) based on the intervals of the rotation pulse signal and the number of the pulse received after the reference pulse signal was generated, respectively.

Further, the ECU 20 calculates the fuel injection timings and the fuel injection amounts of the respective fuel injection valves 10a to 10d based on the accelerator signal supplied from the accelerator sensor 21 and the calculated rotation speed of the engine 1.

In this embodiment, a pilot fuel injection, which injects a small amount of fuel from the fuel injection valve into the combustion chamber during the intake stroke of each cylinder prior to the main fuel injection, is performed. Fuel injected into the combustion chamber by the pilot fuel injection burns before the main fuel injection starts and raise the temperature and the pressure in the combustion chamber to a value suitable for the combustion of fuel. Thus, combustion noise such as diesel knock can be suppressed by performing the pilot fuel injection.

As any known method for calculating the fuel injection timing and the fuel injection amount of the pilot and main fuel injections can be used in the present invention, a detailed explanation for the calculation methods for the amount and timing of the pilot and main fuel injections is not given here.

When the fuel injection is not performed, i.e., when the fuel injection valves are closed, the high pressure fuel pipes 11a to 11d are filled with high pressure fuel having the pressure same as that in the common rail 3. In this state, the tip of the valve element (a needle) of the needle valve in the fuel injection valve closely contacts the valve seat. The tip of the valve element is formed in a substantially conical shape and sealing between the valve seat and the valve element is establisher by fitting the tip of the cone of the valve element into the aperture of the annular valve seat.

A nozzle chamber is formed in the housing of the fuel injection valve around the valve element and the valve seat and the pressure of the fuel filled in the nozzle chamber is exerted on the valve element in the direction for disengaging the valve element from the valve seat. Further, a resilient force of a spring and the fuel pressure is exerted on the valve element on the side opposite to the tip thereof in the direction for urging the valve element to the valve seat.

During the fuel injection, the nozzle chamber is connected to the high pressure fuel pipe by an appropriate means and the pressure in the nozzle chamber increases. When the pressure in the nozzle chamber increases, the force exerted on the valve element in the direction for disengaging the valve element from the valve seat increases and, when the pressure in the nozzle chamber reaches a predetermined pressure (i.e., a valve opening pressure), the valve element disengages from the valve seat. Thus, the fuel in the nozzle chamber is injected from the injection hole through the clearance formed between the valve element and the valve seat, i.e., a fuel injection starts.

The diameter of the aperture of the valve seat becomes larger as the wear of the valve seat increases.

When the diameter of the aperture of the valve seat increases, the depth of the insertion of the tip cone of the valve element into the aperture of the valve seat increases. This causes the area of the portion of the tip cone located outside of the valve seat aperture (i.e., the area of the portion on which the fuel pressure in the nozzle chamber exerts) to decrease. Therefore, when the diameter of the aperture of the valve seat increases due to wear of the valve seat, a larger fuel pressure is required in order to compensate for the reduction in the pressure receiving area and to disengage the valve element from the valve seat. In other words, the value of fuel pressure in the nozzle chamber at which the valve element starts to disengage from the valve seat (i.e., the valve opening pressure) increases as the wear of the valve seat increases.

When the valve opening pressure increases, the time required for the pressure in the nozzle chamber to increase to the valve opening pressure after the fuel injection command signal is received increases. Therefore, when the valve seat wears, the fuel injection period in which the valve element disengages from the valve seat becomes shorter even if the length of the fuel injection command signal is the same.

In other words, as the operation period of the fuel injection valve is prolonged, the fuel injection characteristics of the fuel injection valve change and the actual fuel injection amount gradually decreases even if the fuel injection command signal is the same.

Therefore, when determining the target value for the fuel injection amount, it is necessary to set the target value at a value larger than the value actually required so that a sufficient amount of fuel is injected even after the actual fuel injection amount decreases due to the wear of the valve seat.

Therefore, it is necessary to include an allowance for future decrease in the actual fuel injection amount when determining the target fuel injection amount. Namely, the target fuel injection amount must be set at an amount larger than the amount actually required by the engine so that the fuel injection amount actually required can be obtained even if the actual fuel injection amount decreases from the target fuel injection amount due to the wear of the valve seat.

As the main fuel injection amount is relatively large, the allowance for the fuel injection amount does not largely affect the main fuel injection amount. However, as the pilot fuel injection amount is relatively small, an influence of the allowance on the pilot fuel injection amount is relatively large. Therefore, if the allowance is excessively large, problems such as the formation of exhaust smoke or dilution of lubricating oil may occur due to an excessive fuel injection amount. Further, if the allowance is too small, deterioration of exhaust emission or a disappearance of the pilot fuel injection (due to a decrease in the pilot fuel injection amount) may occur after a long operating period.

The present embodiment solves these problems by detecting the change in the fuel injection characteristics of the fuel injection valve and correcting the fuel injection amount in accordance with the change in the fuel injection characteristics.

When the fuel injection is started, the valve element of the needle valve in the fuel injection valve disengages from the valve seat and the high pressure fuel in the nozzle chamber in the fuel injection valve is injected into the combustion chamber through the fuel injection hole. This causes a sudden pressure drop in the nozzle chamber. This pressure drop propagates through within the fuel passage in the fuel injection valve and the high pressure fuel pipe 11a to 11d (in the following explanation, the high pressure pipes 11a to 11d is generally referred to as "the high pressure fuel pipe 11") connected to the common rail 3 and reaches the common rail. Since propagation of the pressure drop/rise has characteristics of a wave, the pressure drop/rise propagating through the fuel passage and pipes are hereinafter sometimes referred to as "a negative/positive pressure wave" in this specification.

After reaching the common rail 3, the pressure wave is reflected at the entrance of the common rail 3 and propagates through the high pressure fuel pipe 11 toward the fuel injection valve 10 (hereinafter, the fuel injection valves 10a to 10d are generally referred to as "the fuel injection valve 10"). The reflected pressure wave is further reflected at the nozzle chamber and propagates toward the common rail 3 again.

Thus, at the positions of the high pressure fuel pipes where the fuel pressure sensors 27a to 27d are disposed, the pressure fluctuates every time the pressure waves pass after the pilot fuel injection is performed.

Figure 2:
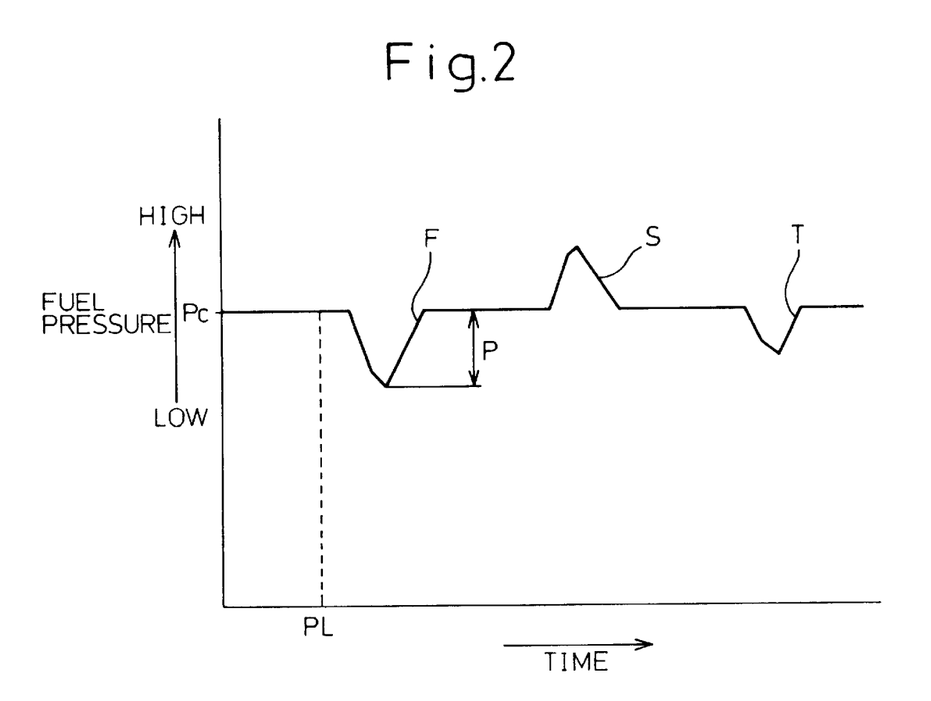
FIG. 2 is a diagram showing fluctuation of the pressure caused in a fuel piping by a pilot fuel injection.

FIG. 2 is a diagram showing the pressure fluctuation at the position of the pressure sensor 27 (the pressure sensors 27a to 27d are hereinafter generally referred to as "the pressure sensor 27"). In FIG. 2, the horizontal axis represents time elapsed after the pilot fuel injection is started and the vertical axis represents the fuel pressure. PL on the vertical axis indicates the time point where the pilot fuel injection is commenced. The pressure drop indicated by F in FIG. 2 designates a pressure fluctuation when the negative pressure wave P generated by the pilot fuel injection passes the pressure sensor 27. This negative pressure wave P propagates through the high pressure fuel pipe 11 and, when it reaches the common rail 3, is reflected there and converted into a positive pressure wave S by the reflection at the entrance of the common rail 3. The positive pressure wave S, as shown in FIG. 2, causes a pressure rise when it passes the sensor 27. Further, the positive pressure wave S is reflected at the nozzle chamber and converted into a negative pressure wave T that causes a pressure drop at the pressure sensor 27 when it passes.

The pressure wave generated by the pilot fuel injection propagate through the high pressure fuel passage back and forth between the common rail 3 and the fuel injection valve 10 by being reflected at both ends while being attenuated. Therefore, the fluctuation of the fuel pressure at the fuel pressure sensor 27 is repeated as the pressure waves pass.

The magnitude of the fluctuation of the fuel pressure is determined by the fuel supply pressure (pressure Pc in FIG. 2) and the fuel injection amount, and the magnitude of the fluctuation (indicated by P in FIG. 2) becomes larger as the fuel injection amount is larger.

As the magnitude of the pressure fluctuation corresponds to the fuel injection amount, the actual fuel injection amount can be calculated from the magnitude of the pressure fluctuation detected by the pressure sensor 27. Therefore, in this embodiment, the change in the fuel injection characteristics of the fuel injection valve 11a through 11d is determined based on the pressure fluctuations in the high pressure fuel pipes 11a through 11d detected by the pressure sensors 27a through 27d immediate after the pilot fuel injections are started.

In this embodiment, the actual fuel injection amount Qpl and the magnitude P of the pressure fluctuation immediately after the fuel injection are measured for various fuel injection pressure Pc using the actual fuel injection system, and the value of the fuel injection amount Qpl is expressed by a numerical table using the fuel injection pressure Pc and the magnitude P of the pressure fluctuation as parameters. Alternatively, the value of Qpl may be expressed by a formula using Pc and P as parameters.

In this embodiment, the numerical table (or calculation formula) expressing the relationships between Qpl and P and Pc is stored in the ROM of the ECU 20.

During the engine operation, the ECU 20 calculates the magnitude P (FIG. 2) of the pressure change based on the outputs of the pressure sensors 27a to 27d at every pilot fuel injection and determines the actual pilot fuel injection amount Qpl from the numerical table stored in ROM using the calculated magnitude P and the fuel injection pressure Pc. The amount of the change in the fuel injection characteristics due to the wear corresponds to the difference dQpl between the target amount Qplt and the actual amount Qpl of the pilot fuel injection. Therefore, by correcting the pilot fuel injection amount in accordance with the difference dQpl, the actual pilot fuel injection amount can be controlled to the same value as the target pilot fuel injection amount Qplt regardless of the change in the fuel injection characteristics.

Further, in this embodiment, the main fuel injection amount is also corrected based on the change in the fuel injection characteristics obtained by the above-explained procedure. As explained before, the influence of the change in the fuel injection amount due to the wear is larger in the pilot fuel injection in which the fuel injection amount is relatively small. However, the change in the fuel injection characteristics also has effects on the main fuel injection.

In this case, as the amount of the increase in the valve opening pressure that causes the change in the fuel injection characteristics is common to the pilot fuel injection and the main fuel injection, the amount of correction is also common to the pilot fuel injection and the main fuel injection.

Therefore, according to the present embodiment, the pilot fuel injection amount as well as the main fuel injection amount always agrees with the target values regardless of the change in the fuel injection characteristics.

FIGS. 3 and 4 are flowcharts explaining the correction of the fuel injection amount according to the present embodiment as explained above. FIG. 3 shows a correction amount calculation and FIG. 4 shows a fuel injection period correction.

The operation of FIG. 3 is performed by the ECU 20 as a routine executed at regular intervals, or every time the crankshaft rotates a predetermined angle.

In FIG. 3, at step 301, it is determined whether it is time to start a pilot fuel injection in any cylinder and, if it is not time to start pilot fuel injection in any cylinder, the operation terminates without executing and other step.

If any of the cylinders (for example, No. i cylinder) is at pilot fuel injection timing at step 301, the operation executes step 303 which calculates the magnitude Pi (P in FIG. 2) of the fluctuation of the fuel pressure in the high pressure fuel pipe 11$i$ based on the pressures detected by the pressure sensor 27$i$ on the fuel pipe 11$i$ before and after the pilot fuel injection is started. At step 305, the pilot fuel injection amount Qpli of the No. i cylinder is calculated from the relationship between Qpl, P and Pc previously stored in ROM of the ECU 20. The pilot fuel injection amount Qpli obtained at step 305 is the amount of fuel actually injected by the pilot fuel injection in the No. i cylinder.

Next, at step 307, the difference dQpli between the target pilot fuel injection amount Qplt and the actual pilot fuel injection amount Qpli of the No. i cylinder obtained at step 305 is calculated as dQpli=Qplt−Qpli. The difference dQpli is a value representing the magnitude of the change in the fuel injection characteristics.

At step 309, it is determined whether the magnitude of the change in the fuel injection characteristics dQpli is equal to or larger than a predetermined value $\alpha$. $\alpha$ is a permissible maximum value for the deviation of the actual pilot fuel injection amount from the target amount and, in this embodiment, is set at a value about 0.5 mm$^3$.

If dQpli is $\geq \alpha$ at step 309, a correction amount of fuel injection period tqcmi is increased by a predetermined value $\beta$. The fuel injection period correction amount tqcmi is a value used for correcting the fuel injection period (a valve opening period) in order to compensate for the change in the fuel injection characteristics and used at steps 407 and 415 in the fuel injection period correction in FIG. 4, as explained later.

In this embodiment, when the target amount of the pilot fuel injection Qplt is determined by ECU 20, the fuel injection period tqpl that is required for injecting the amount Qplt of fuel is calculated based on the fuel injection characteristics of the fuel injection valve. This fuel injection period tqpl is calculated based on a standard fuel injection characteristics of the fuel injection valve, i.e., the average fuel injection characteristics of the fuel injection valve when it is in a new (without wear) state. Therefore, if wear occurs in the valve seat of the fuel injection valve, the amount of fuel actually injected during the fuel injection period tqpl becomes smaller than the target amount Qplt.

The value tqcmi is a correction amount for compensating for this decrease in the fuel injection amount due to the change in the fuel injection characteristics. The value tqcmi is increased until the deviation of the actual fuel injection amount Qpli from the target fuel injection amount Qplt becomes smaller than or equal to the predetermined value $\beta$ by executing steps 309 and 311 in FIG. 3.

After increasing the correction amount tqcmi by $\beta$ at step 311, or if dQpli<$\alpha$ at step 309, it is determined whether the correction amount tqcmi reaches a predetermined value $\gamma$ at step 313. As the magnitude of the correction amount tqcmi represents the magnitude of the change in the fuel injection characteristics, if the value of the correction amount tqcmi is excessively large, it can be determined that the wear of the fuel injection valve is excessively large, that is, the fuel injection valve is deteriorated. In other words, the correction amount tqcmi can be used as a parameter representing the degree of deterioration (wear) of the fuel injection valve as a result of long time operation.

The value $\gamma$ is a maximum allowable value for the correction amount tqcmi, which corresponds to the allowable maximum wear of the fuel injection valve. Therefore, if tqcmi$\geq \gamma$ at step 313, it is determined that the degree of deterioration of the fuel injection valve is excessively large (or the correction amount of fuel injection is excessively large) and, in this case, the value of a flag ALM is set to 1 at step 317 before terminating the operation. If tqcmi<$\gamma$ at step 313, the value of the flag ALM is set to 0 at step 315.

ALM is a flag indicating whether the fuel injection valve deteriorates and, when ALM is set at 1 (deteriorated), an warning lamp disposed near a driver seat is illuminated in order to notify the driver that the fuel injection valve has deteriorated.

By performing the operation in FIG. 3, the magnitude tqcmi of the change in the fuel injection characteristics of each cylinder is calculated when the pilot fuel injection is executed.

FIG. 4 shows the fuel injection period correction using the correction amount tqcmi calculated by the operation in FIG. 3. The operation in FIG. 4 is executed by the ECU 20 as a routine executed at regular intervals, or at a predetermined rotation angle of the crankshaft.

In FIG. 4, at step 401, it is determined whether it is time for starting a pilot fuel injection in any cylinder and, if it is not time for starting pilot fuel injection in any of the cylinders, the operation proceeds to step 409. If it is time for starting a pilot fuel injection in any cylinder (for example, No. i cylinder) at step 401, the target amount for pilot fuel injection Qplt which is determined by ECU 20 based on the engine speed and the amount of depression of an accelerator pedal by an calculating operation, not shown, is read in. Further, at step 405, the fuel injection period tqplt required for injecting the target amount Qplt of fuel is calculated based on the standard fuel injection characteristics of the fuel injection valve stored in the ROM of ECU 20 beforehand.

After calculating the target value tqplt for the fuel injection period at step 405, the fuel injection period tqpli of the No. i cylinder in which the pilot fuel injection is to be executed is calculated by correcting the target fuel injection period tqplt using the correction amount tqcmi obtained by the operation in FIG. 3 as tqpli=tqplt+tqcmi.

By correcting the target fuel injection period using the correction amount in each cylinder, the pilot fuel injection amount in each cylinder exactly agrees with the target pilot fuel injection amount regardless of the change in the fuel injection characteristics of the fuel injection valve.

After correcting the pilot fuel injection period, or if pilot fuel injection is not carried out in any of the cylinders at step 401, the operation proceeds to step 409 where it is determined whether the main fuel injection is to be carried out at present. If main fuel injection is not carried out at present, the operation terminates without executing steps 411 to 415.

If it is time to start the main fuel injection in any of the cylinder (for example, in No. i cylinder), the main fuel injection period tqfini of each cylinder is calculated by the steps 411 through 415 using the correction amount tqcmi obtained previously by the operation in FIG. 3.

Namely, at step 411, a target amount Qfint for the main fuel injection, which is common to all cylinders, is calculated based on, for example, the engine speed and the amount of depression of the accelerator pedal. Further, at step 413, the fuel injection period tqfint required for injecting the amount Qfint of fuel is calculated based on the standard fuel injection characteristics stored in the ROM of the ECU 20.

At step 415, the actual target fuel injection period for No. i cylinder tqfini is calculated by adding the correction amount tqcmi to the standard target period tqfint for the main fuel injection.

By correcting the target fuel injection period using the correction amount in each cylinder, the main fuel injection amount in each cylinder exactly agrees with the target value for the main fuel injection amount.

In this embodiment, though the pilot fuel injection amount is increased when the actual pilot fuel injection amount Qpli becomes smaller than the target amount Qplt by more than a predetermined amount $\alpha$, a more precise correction of the fuel injection amount is possible if the fuel injection amount is further corrected by reducing the fuel injection amount by a predetermined amount when the actual pilot fuel injection amount Qpli is larger than the target amount Qplt by a certain amount.

In this case, if the fuel injection amount is increased and decreased alternately, as this means that the fluctuation of the fuel injection amount between fuel injection cycles is large, it can be determined that some failure has occurred in the fuel injection valve and, in this case, the warning lamp can be illuminated to notify the failure to the driver.

Further, though the pressure sensors 27a through 27d are disposed on the high pressure fuel pipes 11a through 11d connecting the fuel injection valves 10a through 10d to the common rail 3, the pressure sensors may be disposed on other part of the fuel injection system as long as the pressure fluctuation generated by the pilot fuel injection is precisely detected. For example, the pressure sensors may be attached to the respective fuel injection valve so that the pressures in the nozzle chambers of the fuel injection valve is detected.

As explained above, the actual fuel injection amount can be adjusted so that it always agrees with the target fuel injection amount regardless of the change in the fuel injection characteristics caused after a long operating period of the fuel injection valve according to the present invention.

What is claimed is:

1. A fuel injection control device comprising a reservoir storing high pressure fuel and a fuel injection valve connected to the reservoir which injects fuel stored in the reservoir into a combustion chamber of an internal combustion engine, the device executing a pilot fuel injection by injecting fuel into the combustion chamber prior to a main fuel injection, wherein the device further comprises:

fluctuation detecting means for detecting a magnitude of the fluctuation of pressure caused by the pilot fuel injection in fuel supplied to the fuel injection valve;

correction means for calculating a magnitude of change in pilot fuel injection characteristics of the fuel injection valve from standard fuel injection characteristics based on the magnitude of the pressure fluctuation detected by the fluctuation detecting means and for correcting the amount of the pilot fuel injection based on the change in the pilot fuel injection characteristics in such a manner that the actual amount of fuel injected by the pilot fuel injection agrees with a target pilot fuel injection amount.

2. A fuel injection control device as set forth in claim 1, wherein the correction means further corrects the amount of the main fuel injection based on the magnitude of change in the pilot fuel injection characteristics in such a manner that the actual amount of fuel injected by the main fuel injection agrees with a target main fuel injection amount.

3. A fuel injection control device as set forth in claim 1, wherein the correction means further determines that the fuel injection valve has failed when the magnitude of the change in the pilot fuel injection characteristics is larger than a predetermined value.

4. A fuel injection control device as set forth in claim 1, wherein the correction means further determines that the fuel injection valve has failed when an amount of correction of the pilot fuel injection amount is larger than a predetermined value.

5. A fuel injection control device as set forth in claim 2, wherein the correction means further determines that the fuel injection valve has failed when an amount of correction of at least one of the pilot fuel injection amount and main fuel injection amount is larger than a predetermined value.

* * * * *